(12) United States Patent
Baba et al.

(10) Patent No.: US 11,004,341 B2
(45) Date of Patent: *May 11, 2021

(54) APPARATUS AND METHOD FOR SUPPORTING COLLISION AVOIDANCE OF VEHICLE

(71) Applicant: DENSO CORPORATION, Kariya (JP)

(72) Inventors: Takahiro Baba, Kariya (JP); Takaharu Oguri, Kariya (JP); Yosuke Ito, Kariya (JP); Kei Kamiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 202 days.

This patent is subject to a terminal disclaimer.

(21) Appl. No.: 15/855,846

(22) Filed: Dec. 27, 2017

(65) Prior Publication Data

US 2018/0182246 A1 Jun. 28, 2018

(30) Foreign Application Priority Data

Dec. 27, 2016 (JP) .............................. JP2016-253106

(51) Int. Cl.
*B60W 30/095* (2012.01)
*G08G 1/16* (2006.01)
(Continued)

(52) U.S. Cl.
CPC .............. *G08G 1/166* (2013.01); *B60T 7/22* (2013.01); *B60T 8/17* (2013.01); *B60W 40/04* (2013.01);
(Continued)

(58) Field of Classification Search
CPC ... G08G 1/166; B60T 8/17; B60T 7/22; B60T 2210/32; B60T 2201/022; G06K 9/6271;
(Continued)

(56) References Cited

U.S. PATENT DOCUMENTS 9,805,601 B1 * 10/2017 Fields .............. G08G 1/096791
10,145,684 B1 * 12/2018 Tofte ...................... G06Q 40/08
(Continued)

FOREIGN PATENT DOCUMENTS

JP H09-292461 A 11/1997
JP 2008-152388 A 7/2008
JP 2008-152389 A 7/2008

*Primary Examiner* — Masud Ahmed
(74) *Attorney, Agent, or Firm* — Maschoff Brennan

(57) ABSTRACT

A vehicle collision avoidance supporting apparatus may include a situation determination unit configured to determine whether it is a situation that there exists no moving object proceeding in a direction crossing a traveling direction of the vehicle; a first sensor and configured to detect an object ahead of the vehicle; and an avoidance operation controller configured to cause the vehicle to perform a predetermined avoidance operation for avoiding a collision in accordance with a detection result of the first sensor in a determination region ahead of the vehicle. The avoidance operation controller uses a region which is narrower in a direction perpendicular to the travelling direction and parallel to a horizontal direction as the determination region when it is the situation that there exists no moving object than when it is not the situation that there exists no moving object.

20 Claims, 12 Drawing Sheets

(51) Int. Cl.
*B60W 40/04* (2006.01)
*G06K 9/00* (2006.01)
*B60T 7/22* (2006.01)
*G06K 9/78* (2006.01)
*B60T 8/17* (2006.01)
*G06K 9/62* (2006.01)

(52) U.S. Cl.
CPC ..... *G06K 9/00798* (2013.01); *G06K 9/00805* (2013.01); *G06K 9/00818* (2013.01); *G06K 9/00825* (2013.01); *G06K 9/6271* (2013.01); *G06K 9/78* (2013.01); *B60T 2201/022* (2013.01); *B60T 2210/32* (2013.01); *B60W 2420/42* (2013.01); *B60W 2420/52* (2013.01); *B60W 2520/10* (2013.01); *B60W 2540/10* (2013.01)

(58) Field of Classification Search
CPC .......... G06K 9/00805; G06K 9/00825; G06K 9/00798; G06K 9/78; G06K 9/00818; B60W 40/04; B60W 2420/52; B60W 2420/42; B60W 2520/10; B60W 2540/10
USPC .......................................................... 701/93
See application file for complete search history.

(56) References Cited

U.S. PATENT DOCUMENTS

| | | | |
|---|---|---|---|
| 10,227,071 B2* | 3/2019 | Nishimura | B60W 10/18 |
| 10,266,176 B2* | 4/2019 | Nishimura | B60W 10/18 |
| 10,355,365 B2* | 7/2019 | Izadian | G01S 13/426 |
| 2009/0265193 A1* | 10/2009 | Collins | G06Q 30/0185 |
| | | | 705/4 |
| 2011/0095908 A1* | 4/2011 | Nadeem | B60H 3/00 |
| | | | 340/905 |
| 2015/0197248 A1* | 7/2015 | Breed | G08G 1/09626 |
| | | | 701/93 |
| 2016/0185348 A1* | 6/2016 | Miura | B60W 30/0953 |
| | | | 701/41 |
| 2016/0207534 A1* | 7/2016 | Nishimura | B60W 50/14 |
| 2016/0357262 A1* | 12/2016 | Ansari | G06F 3/017 |
| 2017/0103275 A1* | 4/2017 | Yamanoi | G01C 21/26 |
| 2017/0217432 A1 | 8/2017 | Minemura et al. | |
| 2017/0329332 A1* | 11/2017 | Pilarski | B60W 50/0097 |
| 2018/0105182 A1* | 4/2018 | Kim | B60W 50/00 |
| 2018/0107215 A1* | 4/2018 | Djuric | G06N 3/04 |
| 2018/0182247 A1 | 6/2018 | Baba et al. | |
| 2019/0039616 A1* | 2/2019 | Leff Yaffe | H04W 4/027 |

* cited by examiner

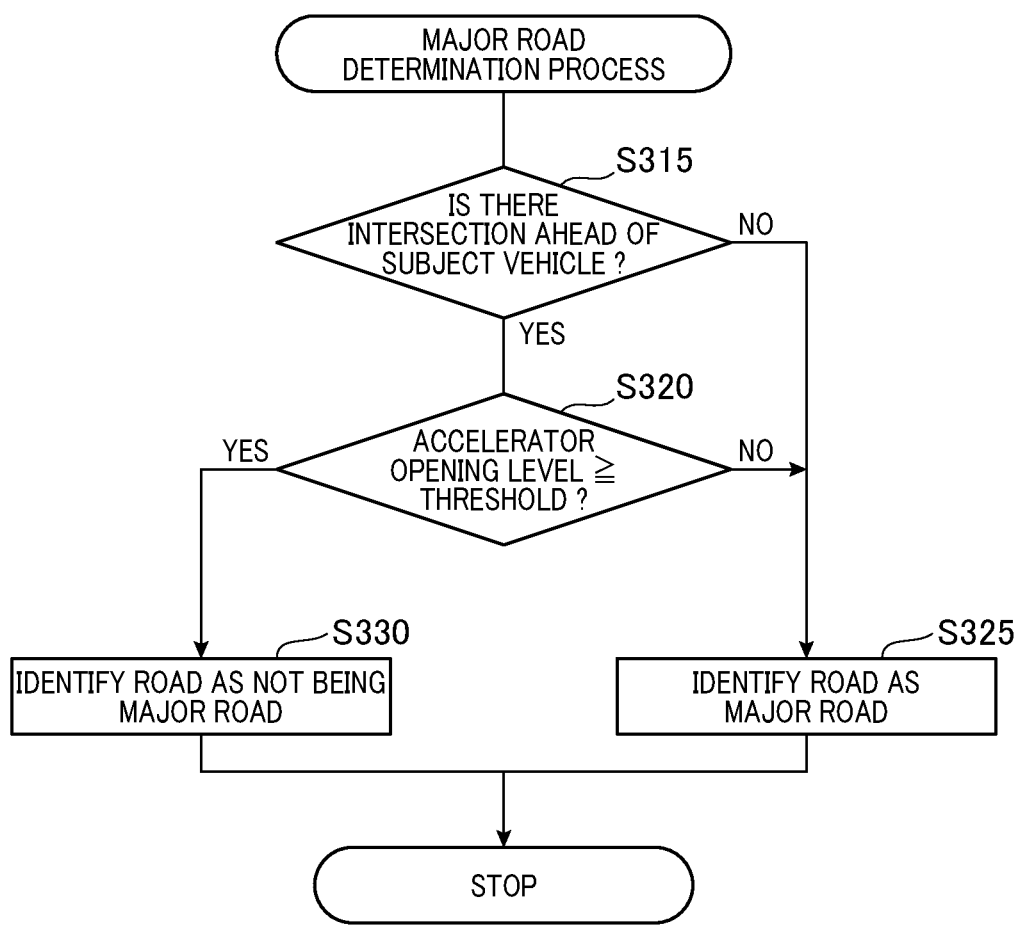

FIG.12

MODIFIED EXAMPLE

[NORMAL OPERATION MODE]

| TYPE OF AVOIDING OPERATION | MILLIMETER WAVE RADAR & IMAGE SENSOR | MILLIMETER WAVE RADAR ONLY | IMAGE SENSOR ONLY |
|---|---|---|---|
| ALERT | ○ (ALLOWED) | ○ (ALLOWED) | × (NOT ALLOWED) |
| BRAKING | ○ (ALLOWED) | ○ (ALLOWED) | × (NOT ALLOWED) |

[RELAXED OPERATION MODE]

| TYPE OF AVOIDING OPERATION | MILLIMETER WAVE RADAR & IMAGE SENSOR | MILLIMETER WAVE RADAR ONLY | IMAGE SENSOR ONLY |
|---|---|---|---|
| ALERT | ○ (ALLOWED) | ○ (ALLOWED) | × (NOT ALLOWED) |
| BRAKING | ○ (ALLOWED) | × (NOT ALLOWED) | × (NOT ALLOWED) |

APPARATUS AND METHOD FOR SUPPORTING COLLISION AVOIDANCE OF VEHICLE

CROSS-REFERENCE TO RELATED APPLICATION

This application claims priority to and the benefit of Japanese Patent Application No. 2016-253106 filed in the Japanese Patent Office on Dec. 27, 2016, the entire contents of which are incorporated herein by reference.

BACKGROUND

Technical Field

The present disclosure relates to an apparatus and method for supporting collision avoidance of a vehicle.

Background Art

For avoiding collision of a vehicle with another vehicle, a pedestrian or the like, various kinds of collision avoidance supporting apparatuses have been proposed each of which detects presence of a moving object such as another vehicle or a pedestrian ahead of the vehicle by using a laser radar or a camera and automatically operating an alert and a brake when the moving object is detected. Japanese Unexamined Patent Publication No. 2016-35634 discloses a collision avoidance supporting apparatus which adjusts a size of a determination region for determining whether to perform a collision avoidance supporting operation using the alert or the brake for each moving object according to the direction and moving speed of the moving object proceeding toward a road on which the subject vehicle is traveling.

RELATED ART DOCUMENT

Patent Document

[Patent Document 1] Japanese Patent Publication No. 2016-35634

The above information disclosed in this Background section is only to enhance the understanding of the background of the disclosure and therefore it may contain information that does not form the prior art that is already known to a person of ordinary skill in the art.

According to the collision avoidance supporting apparatus disclosed in the above document, it is necessary to set a very wide area as the determination region and determine the presence or absence of the moving object in such a very wide area always because even when the moving object is located very far from the road on which the subject vehicle is traveling, it has a probability of collision with the subject vehicle if the speed of the moving object is high. If the presence or absence of the moving object is determined always in a very wide area in such a manner, there is high risk that another vehicle having a low risk of colliding with the subject vehicle may be erroneously detected as a vehicle having a high risk of collision.

SUMMARY

Thus, it is desirable to provide a collision avoidance supporting apparatus that is capable of accurately detecting a moving object moving in a direction crossing the traveling direction of the subject vehicle.

The present disclosure has been made in an effort to solve at least some of the above-mentioned problems, and may be implemented in the following modes.

In at least one embodiment according to the present disclosure, provided is a collision avoidance supporting apparatus mountable and usable in a vehicle. The vehicle collision avoidance supporting apparatus may include a situation determination unit 11 configured to determine whether it is a situation that there exists no moving object proceeding in a direction crossing a traveling direction of the vehicle; a first sensor 22 configured to detect an object ahead of the vehicle; and an avoidance operation controller 12 configured to cause the vehicle to perform a predetermined avoidance operation for avoiding a collision in accordance with a detection result of the first sensor in a determination region ahead of the vehicle. The avoidance operation controller uses a region which is narrower in a direction perpendicular to the travelling direction and parallel to a horizontal direction as the determination region when it is the situation that there exists no moving object than when it is not the situation that there exists no moving object.

According to the vehicle collision avoidance supporting apparatus of the above aspect, it is possible to suppress an erroneous detection of over-sensitively detecting the moving object proceeding in a crossing direction and having a high probability of collision since, when it is the situation that there exists no moving object, a region which is narrower in a direction perpendicular to the travelling direction and parallel to a horizontal direction is used as the determination region than when it is not the situation that there exists no moving object. Also, when it is not the situation that there exists no moving object, that is, in the case that there is a moving object, it is possible to easily detect the moving object proceeding in the crossing direction and having a high probability of collision since a wider region is used as the determination region compared with the case that it is determined to be the situation that there exists no moving object.

The present disclosure can be implemented in various forms other than the vehicle collision avoidance supporting apparatus. For example, the present disclosure may be implemented in the form of a vehicle collision avoidance supporting method, a vehicle equipped with the vehicle collision avoidance supporting apparatus', a computer program for implementing the device or the method, and the like.

BRIEF DESCRIPTION OF THE DRAWINGS

In the accompanying drawings:

FIG. 11 is a flowchart illustrating a procedure of the major road determination process according to a second embodiment; and FIG. 12 is a table summarizing whether each of the avoidance operations is performed or not according to detection results of each of the sensors in a modified embodiment.

DETAILED DESCRIPTION OF THE EMBODIMENTS

Various exemplary embodiments will now be described according to the accompanying drawings.

A. First Embodiment

A1. Configuration of Apparatus

Figure 1:
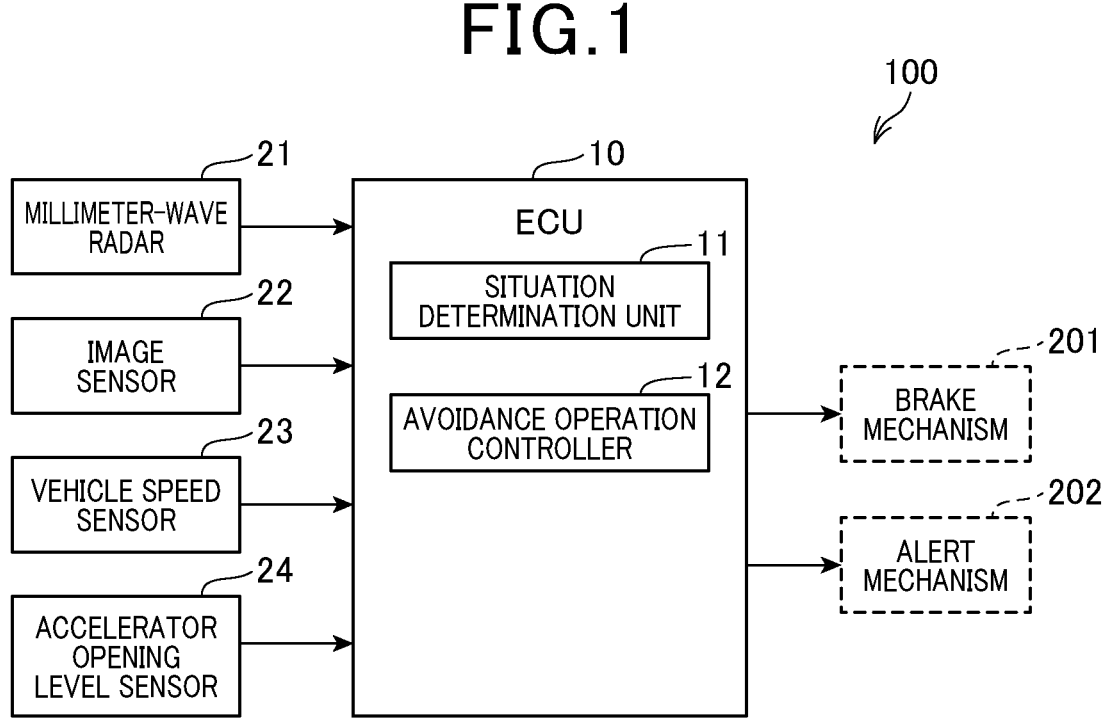
FIG. 1 is a schematic block diagram illustrating a configuration of a vehicle collision avoidance supporting apparatus according to an embodiment of the present disclosure.

As shown in FIG. 1, there is provided an apparatus 100 for supporting collision avoidance of a vehicle, which will now be referred to as a vehicle collision avoidance support apparatus. In this apparatus 100, a method of supporting collision avoidance of a vehicle is also carried out.

The vehicle collision avoidance supporting apparatus 100 according to a first embodiment shown in FIG. 1, which is mounted on a vehicle (not shown in FIG. 1 but referenced by 'vehicle 300' below), determines presence or absence of another vehicle, a pedestrian, and the like that are likely to collide with the subject vehicle, and performs a collision avoiding operation when such a vehicle, pedestrian, etc., that may interfere with the subject vehicle is detected. Details of the collision avoiding operation will be described below. The vehicle collision avoidance supporting apparatus 100 includes an Electronic Control Unit (ECU) 10, a millimeter-wave radar 21, an image sensor 22, a vehicle speed sensor 23, and an accelerator opening level sensor 24.

The ECU 10 controls the collision avoiding operation. The ECU 10 is electrically connected to the millimeter-wave radar 21, the image sensor 22, the vehicle speed sensor 23, and the accelerator opening level sensor 24 to receive a detection result from each of the devices. Also, the ECU 10 is electrically connected to a brake mechanism 201 and an alert mechanism 202. The brake mechanism 201 includes another ECU (not shown) for controlling a brake system (not shown) of the subject vehicle and relevant systems. The alert mechanism 202 includes a speaker and a display unit (not shown) mounted on the vehicle, and another ECU (not shown) for controlling the speaker and the display unit. For example, the display unit may be configured as a part of an instrument panel provided in the passenger compartment.

The ECU 10 includes a CPU, a ROM, and a RAM. The CPU functions as a situation determination unit 11 and an avoidance operation controller 12 when a control program stored in advance in the ROM is loaded in the RAM and executed.

The situation determination unit 11 determines whether it is a situation that there exists no moving object proceeding in a direction crossing the traveling direction of the subject vehicle (referred to as 'non-existence situation' hereinbelow). The avoidance operation controller 12 controls the brake mechanism 201 and the alert mechanism 202 to perform a collision avoiding operation by executing a collision avoidance supporting process using detection results of the sensors such as the millimeter-wave radar 21, the image sensor 22, the vehicle speed sensor 23, and the accelerator opening level sensor 24 electrically connected to the ECU 10.

The millimeter-wave radar 21 which uses radio waves in the millimeter-wave band detects a presence of any object ahead of the subject vehicle such as a preceding vehicle, an opposite lane vehicle, a vehicle on a road crossing the road on which the subject vehicle is travelling, a pedestrian, a guardrail, a manhole, and a traffic light, and estimates a distance between the object and the subject vehicle, the position of the object, the size of the object, and the relative velocity of the object with respect to the subject vehicle. An object is detected as a plurality of detection points that may be referred to as 'object indicators' hereinbelow. Thus, multiple object indicators may be acquired for a single object, for example, when the ignition of the subject vehicle is turned on, the millimeter-wave radar 21 repetitively continues the detection operation by transmitting the millimeter-radio waves and receiving reflected waves.

The image sensor 22, which is comprised of an image pickup camera including a focusing lens and a light receiving element, picks up a photographed mage of an area ahead of the subject vehicle. When the ignition of the subject vehicle is turned on, the image sensor 22 repetitively continues to acquire the photographed image.

The vehicle speed sensor 23 detects the speed of the vehicle. When the ignition of the subject vehicle is turned on, the vehicle speed sensor 23 repetitively continues to detect the speed of the vehicle. The accelerator opening level sensor 24 detects the accelerator opening level. The accelerator opening level is a parameter related with a pressing level (operation amount) of an accelerator (not shown) exerted by the driver in the subject vehicle. A large accelerator opening level means that the level of the pressing against the accelerator exerted by the driver is large, and generally implies that the driver is reluctant to reduce the speed of the subject vehicle.

The millimeter-wave radar 21 and the image sensor 22 described above belong to the first sensor mentioned in a column of a technical solution.

A2. Collision Avoiding Operation

In the present embodiment, the collision avoiding operation means alerting and braking. Alerting is performed by outputting an alert sound through a speaker and turning on a predetermined lamp on an instrument panel. Also, an operation of vibrating a steering wheel may be performed as one kind of alert for the driver. Further, it is also possible to change a predetermined lamp from a turned-on state to a turned-off state or blink the predetermined lamp.

Figure 2:
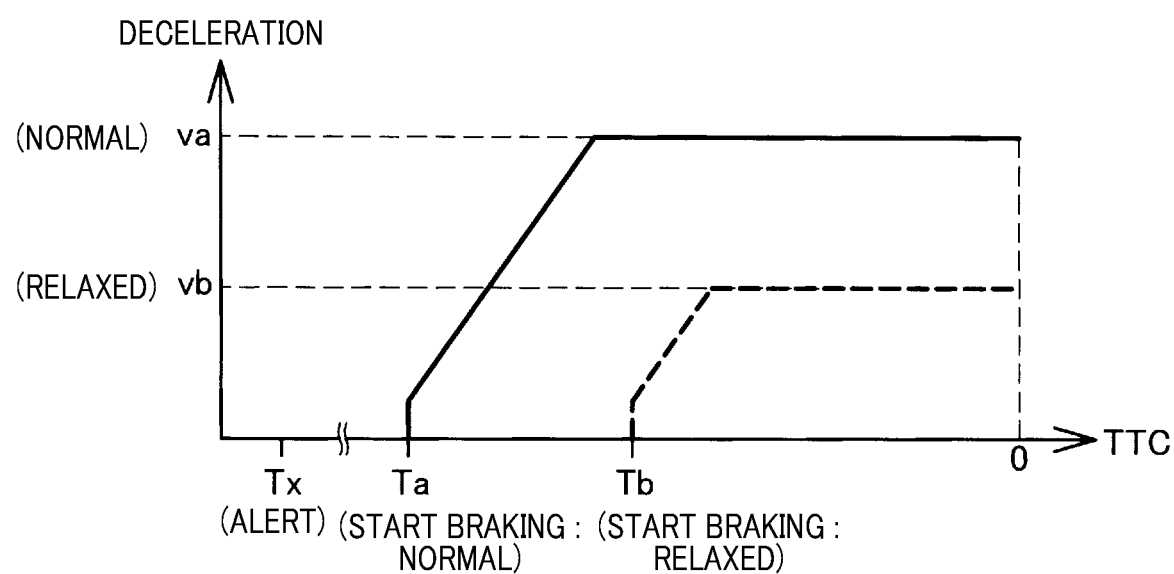
FIG. 2 is a graph for explaining execution timings of collision avoiding operations and decelerations during braking operations.

Braking will now be described with reference to FIG. 2. In FIG. 2, a horizontal axis denotes a time-to-collision (TTC) and a vertical axis denotes a deceleration during the braking operation. In FIG. 2, a timing when the horizontal axis is zero indicates a predicted collision timing.

As shown in FIG. 2, the alerting is performed at a timing Tx. Afterwards, the braking may be performed. As will be described below, it is assumed that there are just two braking modes in the present embodiment: a mode where the brake is relaxedly operated or operated in a reduced or eased manner (referred to as 'relaxed operation mode' hereinbelow) and another mode where the brake is ordinarily operated with little relaxation (referred to as 'normal operation mode' hereinbelow). In FIG. 2, a thick solid line denotes a deceleration profile of the subject vehicle in the normal operation mode, and a thick broken line denotes a deceleration profile of the subject vehicle in the relaxed operation mode.

In the normal operation mode, the brake starts the braking operation at a timing Ta to decelerate the subject vehicle at a predetermined acceleration until the subject vehicle reaches a predetermined deceleration va, and maintains the deceleration va from the moment that the predetermined deceleration va is reached till the predicted collision timing. Contrarily, in the relaxed operation mode, the brake starts the braking operation at a timing Tb which is later than the timing Ta (i.e., closer to the predicted collision timing) to decelerate the subject vehicle at a predetermined acceleration until the subject vehicle reaches a predetermined deceleration vb that is smaller than the deceleration va, and maintains the deceleration vb from the moment that the predetermined deceleration vb is reached till the predicted collision timing. Accordingly, in the relaxed operation mode, the brake starts its operation later and the final deceleration level is lower than the normal operation mode. Therefore, the braking distance is extended and the braking operation is performed loosely. Meanwhile, the timing Tx at which the alerting is performed is the same between in the normal operation mode and in the relaxed operation mode in the present embodiment.

The vehicle collision avoidance supporting apparatus 100 having the above-described configuration may execute the collision avoidance supporting process described below to determine whether or not the vehicle is in a non-existence situation which is a situation that there exists no moving object proceeding in a direction crossing the traveling direction of the subject vehicle, and precisely detect a moving object having a high probability of collision in a situation other than the non-existence situation, that is, in the situation that there exists the moving object proceeding in the direction crossing the traveling direction of the subject vehicle while suppressing an erroneous detection of over-sensitively detecting the moving object of a high probability of collision in the non-existence situation.

A3. Collision Avoidance Supporting Process

Figure 3:
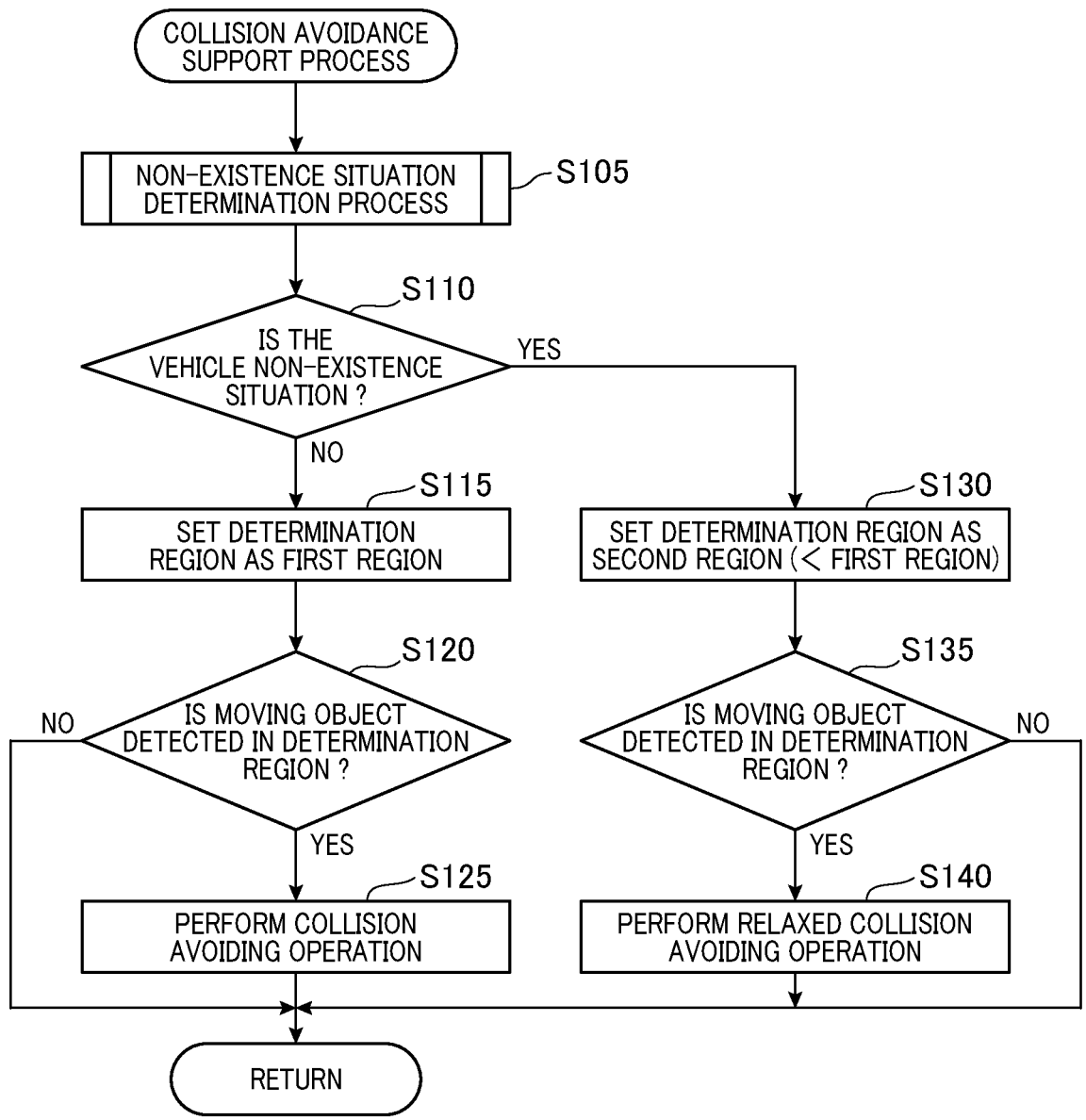
FIG. 3 is a flowchart illustrating a procedure of a collision avoidance supporting process according to a first embodiment.

The collision avoidance supporting process is a process of detecting an object ahead of the subject vehicle that has a probability of colliding with the subject vehicle and performing the collision avoiding operation when such an object is detected. The collision avoidance supporting apparatus 100 executes the collision avoidance supporting process while the ignition of the subject vehicle is turned on. As shown in FIG. 3, in the collision avoidance supporting process, a non-existence situation determination process is executed first (step S105). In the non-existence situation determination process, it is determined whether the vehicle is in the non-existence situation, that is, whether there exists no moving object proceeding in the direction crossing the traveling direction of the subject vehicle. The detailed procedure of the non-existence situation determination process will be described below.

The situation determination unit 11 determines whether the vehicle is in the non-existence situation or not in step S110 based on the result of the non-existence situation determination process of S105. When it is determined that the vehicle is not in the non-existence situation (NO in the step S110), the avoidance operation controller 12 sets a first region as a region for detecting an object ahead of the subject vehicle (referred to as 'determination region' hereinbelow) (Step S115). The first region will be described with reference to FIG. 4.

Figure 4:
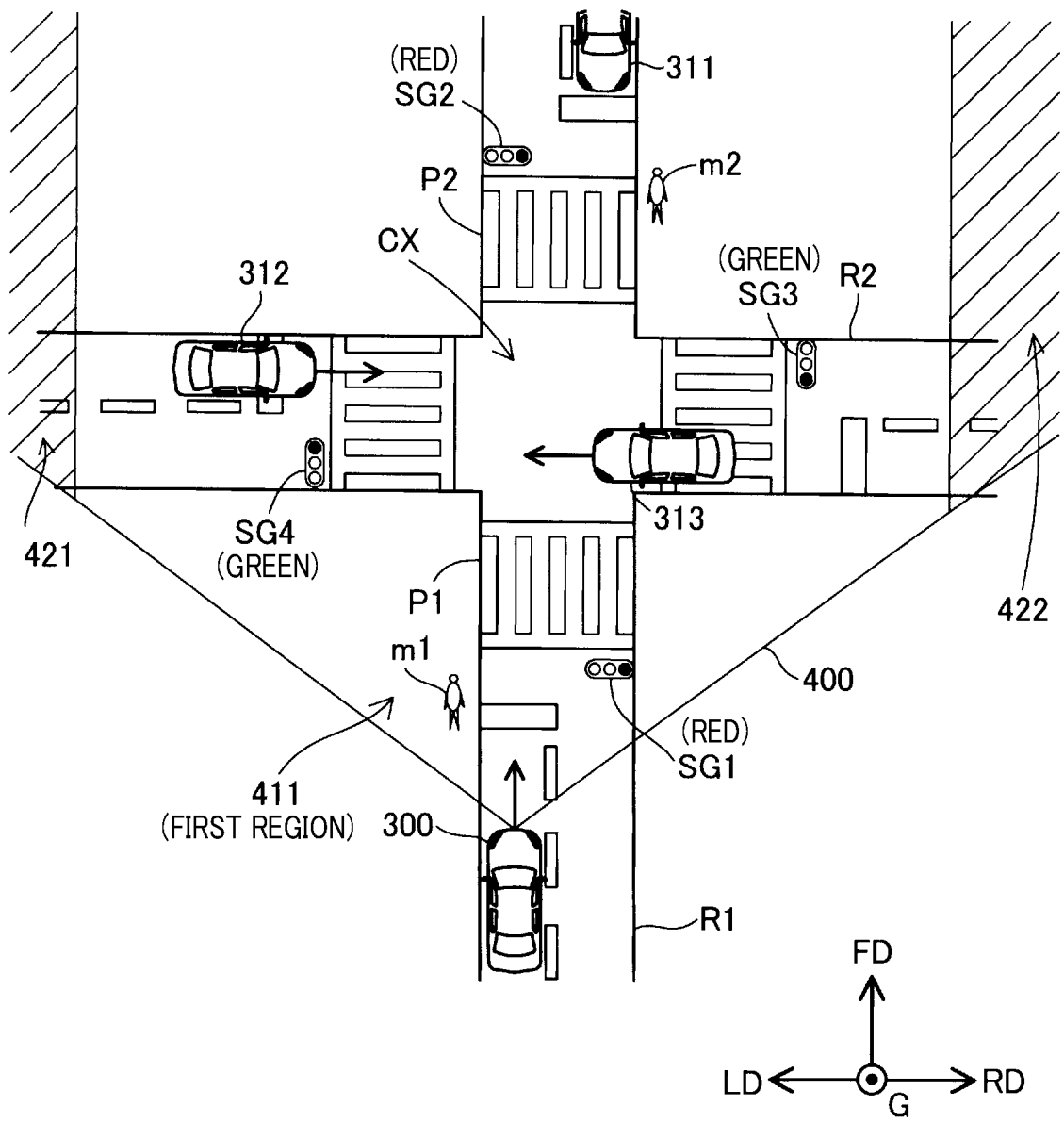
FIG. 4 is a schematic plan view illustrating an example of a situation where a first region is set as a determination region.

In FIG. 4, the subject vehicle 300 is traveling on a road R1 in the vicinity of an intersection CX. Among the vehicles 300, 311, 312, and 313 in FIG. 4, traveling vehicles 300, 312, and 313 are provided with arrows which indicate traveling directions of respective vehicles for convenience of explanation. It is assumed that the color phases of both the two traffic lights SG1 and SG2 provided on the road R1 are red which prohibits any traffic from proceeding. Accordingly, the vehicle 300 is going to stop at a stop line on the road R1 just before the intersection CX. On the opposite lane of the lane where the vehicle 300 is traveling on the road R1, the vehicle 311 has already stopped at a stop line before the intersection CX. Meanwhile, the traffic signal SG1 is disposed in the vicinity of a crosswalk P1 that is near from the vehicle 300. Also, the traffic light SG2 is disposed in the vicinity of a crosswalk P2 that is far from the vehicle 300. It is assumed that the color phases of both the two traffic lights SG3 and SG4 provided on a road R2 intersecting with the road R1 at the intersection CX are green which allows traffic to proceed in their forward direction. Accordingly, two vehicles 312 and 313 are traveling on the road R2. The two vehicles 312 and 313 are running on opposite lanes. The vehicle 312 is going to enter the intersection CX from the left as viewed from the vehicle 300. The vehicle 313 is running in the intersection CX to the left direction as viewed from the vehicle 300.

In FIG. 4, a reference numeral 400 represents a region which is located ahead of the subject vehicle 300 and from which the subject vehicle 300 may receive the reflected millimeter waves. Although the region 400 in FIG. 4 is depicted as a planar region because the drawing is a planar view viewed from above, it should be noted that the region 400 is extended in the vertical direction G. In the example of FIG. 4, a first region 411 is a central part of the region 400 obtained by excluding, from the region 400, an out-of-consideration region 421 separated by a predetermined distance or more from a central line of the vehicle 300 in the left direction LD and another out-of-consideration region 422 separated by the predetermined distance or more from the central line of the vehicle 300 in the right direction RD.

Although details will be described later, in the situation depicted in FIG. 4, the situation determination unit 11 determines that the vehicle is not in the non-existence situation, and the avoidance operation controller 12 sets the first region 411 as the determination region. The determination region at this time (i.e., the first region 411) is wider than a second region 412 which is set when it is determined that the vehicle is not in the non-existence situation as described below. As a result, the first region 411 shown in FIG. 4 encompasses the two vehicles 312 and 313 traveling on the road R2 that crosses the road R1 on which the vehicle 300 is traveling in addition to the vehicle 311 on the opposite lane. Furthermore, two pedestrians m1 and m2 walking on sidewalks (not shown) in the vicinity of the road R1 are encompassed also. In other words, according to the present embodiment, when the vehicle 300 is traveling in the vicinity of the intersection or inside the intersection as shown in FIG. 4, the first region 411 is set to have such a large size that the determination region encompasses the preceding vehicle and the opposite lane vehicle as well as vehicles on the road crossing the road on which the subject vehicle is travelling and pedestrians in the vicinity of the intersection.

Referring back to FIG. 3, after the above-described step S115 is completed, the avoidance operation controller 12 determines, by using the detection result of the millimeter-wave radar 21 and the detection result of the image sensor 22, whether a moving object that moves in a direction crossing the proceeding direction FD of the subject vehicle 300 in the determination region and has a probability of colliding with the subject vehicle 300 is detected (step S120). When it is determined that such a moving object has been detected (YES in the step S120), the avoidance operation controller 12 performs the collision avoiding operation by controlling the brake mechanism 201 and the alert mechanism 202 (step S125). The collision avoiding operation of the step S125 is performed as an operation at the normal operation mode. After step the S125, the procedure returns to the step S105 described above.

In step S120 described above, it is possible to estimate the shape of the object by image recognition, for example, applying a deep neural network based on the plurality of target indicators and predict to which direction and at what speed the detected object is moving from a plurality of estimation results. Also, it is possible to perform image processing such as edge detection or the like for the captured image which is the detection result of the image sensor 22, estimate the shape of the object, and predict to which direction and at what speed the detected object is moving from a plurality of estimation results (i.e. a plurality of images). In the present embodiment, it is determined that a moving object possibly colliding with the subject vehicle 300 is detected when the moving object has been detected in both the case of using the detection result of the millimeter wave radar 21 and the case of using the detection result of the image sensor 22 or when the moving object has been detected in the case of using only the detection result of the millimeter wave radar 21. Therefore, when the moving object has been detected just in the case of using the detection result of the image sensor 22 only, it is determined in the step S120 that no moving object having the probability of colliding with the subject vehicle 300 is detected. When it is determined in the step S120 that no moving object having the probability of collision with the subject vehicle is detected (NO in the step S20), the procedure returns to the step S105.

In case that it is determined in the step S110 that the vehicle is in the non-existence situation (YES in the step S110), the avoidance operation controller 12 sets the second region which is narrower than the first region as the determination region (step S130). The second region will be described with reference to FIG. 5.

In FIG. 4, the subject vehicle 300 is traveling on the road R1 in the vicinity of the intersection CX similarly to the situation of FIG. 4. Also, arrows indicating the traveling directions are attached to the respective traveling vehicles 300 and 311 among all the vehicles 300, 311, 312, and 313 for convenience of explanation in FIG. 5 similarly to FIG. 4. It is assumed in the situation of FIG. 5 that the color phases of both the two traffic lights SG1 and SG2 on the road R1 are green and the color phases of both the two traffic lights SG3 and SG4 on the road R2 are red contrarily to case of FIG. 4. Accordingly, the vehicle 300 is going to enter the intersection CX instead of stopping before the intersection CX. Also, the vehicle 311 traveling on the opposite lane is in the course of traveling in the intersection CX. Meanwhile, each of the two vehicles 312 and 313 on the road R2 is stopped at a stop line.

Figure 5:
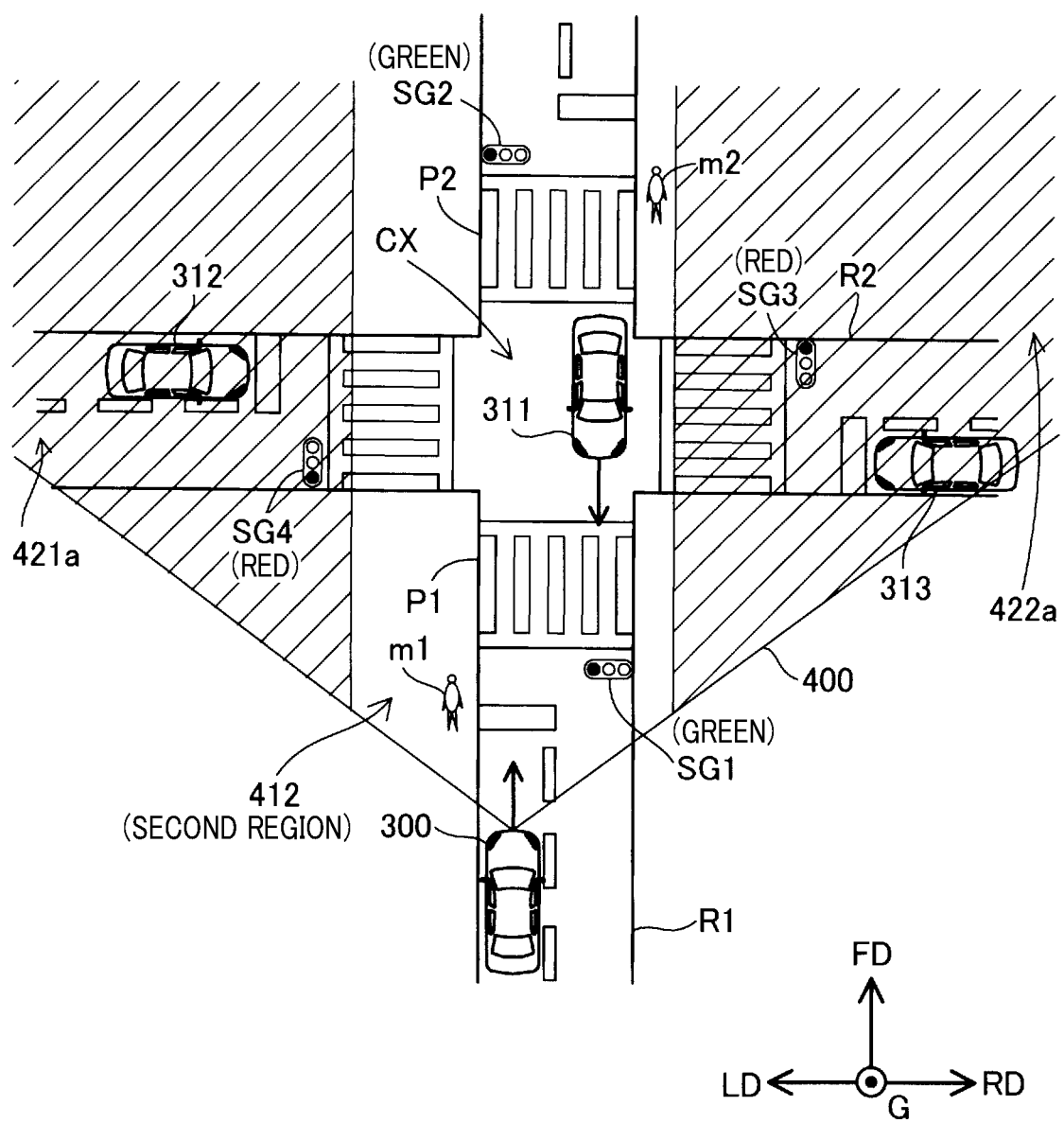
FIG. 5 is a schematic plan view illustrating an example of a situation where a second region is set as the determination region.

In FIG. 5, the region 400 represents the region which is located ahead of the subject vehicle 300 and from which the subject vehicle 300 may receive the reflected millimeter waves similarly to the region 400 shown in FIG. 4. In the example of FIG. 5, the second region 412 is a central part of the region 400 obtained by excluding, from the region 400, an out-of-consideration region 421a separated by a predetermined distance or more from the central line of the vehicle 300 in the left direction LD and another out-of-consideration region 422a separated by the predetermined distance or more from the central line of the vehicle 300 in the right direction RD. However, as can be understood from a comparison with FIG. 4, the out-of-consideration region 421a in FIG. 5 is wider than the out-of-consideration region 421 in FIG. 4. Also, the out-of-consideration region 422a in FIG. 5 is wider than the out-of-consideration region 422 in FIG. 4. Therefore, the second region 412 shown in FIG. 5 is narrower than the first region 411 shown in FIG. 4. For example, the width of the second region 412 may be set to one-third (⅓) of the width of the first region 411. The ratio is not limited to one-third, but may be set to an arbitrary ratio smaller than one (1) as well. The term 'width' is used in the present embodiment to refer to a width measured in a direction perpendicular to the travelling direction FD and parallel to a horizontal direction. In the present embodiment, the second region 412 is set to have such a size that the second region 412 encompasses the road on which the subject vehicle 300 is traveling along with sidewalks neighboring to the road as shown in FIG. 5. Therefore, the pedestrian m1 on the sidewalk in the vicinity of the traveling lane of the subject vehicle 300 and the pedestrian m2 on the sidewalk in the vicinity of the opposite lane are encompassed in the second region 412.

Referring back to FIG. 3, after the above-described step S130 is completed, the avoidance operation controller 12 determines whether a moving object having a probability of colliding with the subject vehicle 300 in the determination region is detected (step S135). Since the step S135 is similar to the above-described step S120, a detailed description of the step will be omitted. When it is determined in the step S135 that such a moving object has been detected (YES in the step S120), the avoidance operation controller 12 performs the collision avoiding operation by controlling the brake mechanism 201 and the alert mechanism 202 (step S140). The collision avoiding operation of the step S140 is performed as an operation at the relaxed operation mode. Thus, the brake starts the operation later and the final deceleration level is lower than the normal operation mode. After step the S140 is completed or when it is determined in the step S135 that no moving object having the probability of collision with the subject vehicle is detected (NO in the step S135), the procedure returns to the step S105.

Next, described is the reason why the second region 412 that is relatively narrow is set as the determination region and the collision avoiding operation is performed in the relaxed operation mode as described above when it is determined that the vehicle is in the non-existence situation. In case that it is determined that the vehicle is in the non-existence situation, the probability of existence of a vehicle having a high probability of collision with the subject vehicle is low since there exists no moving object proceeding in the direction crossing the traveling direction of the subject vehicle. Therefore, setting of the relatively narrow second region as the determination region in such a case may suppress an erroneous detection of a vehicle having a high probability of collision with the subject vehicle. Further, when it is determined that the vehicle is in the non-existence situation, a determination in the step S135 that a moving object having a high probability of collision with the subject vehicle is detected may be erroneous since there exists no moving object proceeding in the direction crossing the traveling direction of the subject vehicle. Thus, performing of the collision avoiding operation in the relaxed operation mode may suppress unexpected rear-end collisions caused by following vehicles since the braking start timing is retarded and the deceleration level is lowered.

On the other hand, in case that it is determined that the vehicle is in an existence situation, the relatively wide first region 411 is set as the determination region and the collision avoiding operation is performed in the normal operation mode. Thus, it is easy to detect a moving object proceeding in the direction crossing the traveling direction of the subject vehicle, particularly, a moving object approaching at a high speed from a distant position, and it is possible to accurately detect a vehicle having a high probability of collision with the subject vehicle. Also, in case that it is determined in the step S120 that a moving object having a high probability of collision with the subject vehicle is detected, performing of the collision avoiding operation in the normal operation mode may certainly reduce the probability of the collision with the moving object.

A4. Process of Determining Non-Existence Situation

The detailed procedure of the non-existence situation determination process (the step S105 in FIG. 3) will now be described with reference to FIG. 6. First, in step S205, the situation determination unit 11 identifies, from the images acquired by the image sensor 22, the presence or absence of the traffic lights of which color phases allow traffic to proceed on the road on which the subject vehicle is traveling. In the present embodiment, the 'traffic light of which color phase allows traffic to proceed' refers to a traffic light having the color phase of 'green' or 'yellow.' Also, the term may refer to a traffic light having the color phase of 'green' excluding the color phase of 'yellow' as well. For example, the traffic lights may be identified from the images by applying a shape recognition algorithm, and then the traffic lights having the color phase of 'green' or 'yellow' may be identified according to the brightness of the color lights on each of the traffic light.

The situation determination unit 11 determines whether there is a traffic light of which color phase allows traffic to proceed based on a result of the step S205 (step S210), and identifies that the vehicle is in the non-existence situation when it is determined in the step S210 that there is such a traffic light (step S230). We assume that there is a traffic light of which color phase allows traffic to proceed on the road on which the subject vehicle is traveling. In case that the traffic light is disposed at the intersection, the traffic lights on the road crossing the traveling direction of the subject vehicle at the intersection have the color phase prohibiting any traffic from proceeding (i.e., the color phase of 'red') as shown in FIG. 5. Thus, it can be said that there exists no moving object proceeding in the direction crossing the traveling direction of the subject vehicle in this case. In case that the traffic light is installed at a location other than the intersection (e.g., in the vicinity of a crosswalk with no crossing road), it can be said also that there exists no moving object proceeding in the direction crossing the traveling direction FD of the subject vehicle 200 and there is just a pedestrian, in the vicinity of the crosswalk, who waits for the pedestrian signal to turn green. Therefore, in the present embodiment, when the traffic light of which color phase allows traffic to proceed present, it is identified as the non-existence situation.

If it is determined in the step S210 that there is no traffic light of which color phase allows traffic to proceed (NO in the step S210), the millimeter-wave radar 21 detects the object indicators based on the reflected waves of the millimeter-waves (step S215). The situation determination unit 11 identifies whether there is a wall body at a predetermined position by using the object indicators detected in the step S215 (step S220). The predetermined position in the step S220, in the present embodiment, means any of verges of the road on which the subject vehicle is traveling and the space between the subject vehicle and the opposite lane vehicle. Further, the term 'wall body' refers to a structure having a certain height in a direction intersecting with the road (vertically upward direction, in general) and disposed along the road on which the subject vehicle is traveling, and may include a guard rail and a median strip, for example.

After the step S220, the situation determination unit 11 determines whether there is the wall body (step S225). When it is determined in the step S225 that there is the wall body, the above-described step S230 is executed, and the vehicle is identified to be in the non-existence situation.

Figure 7:
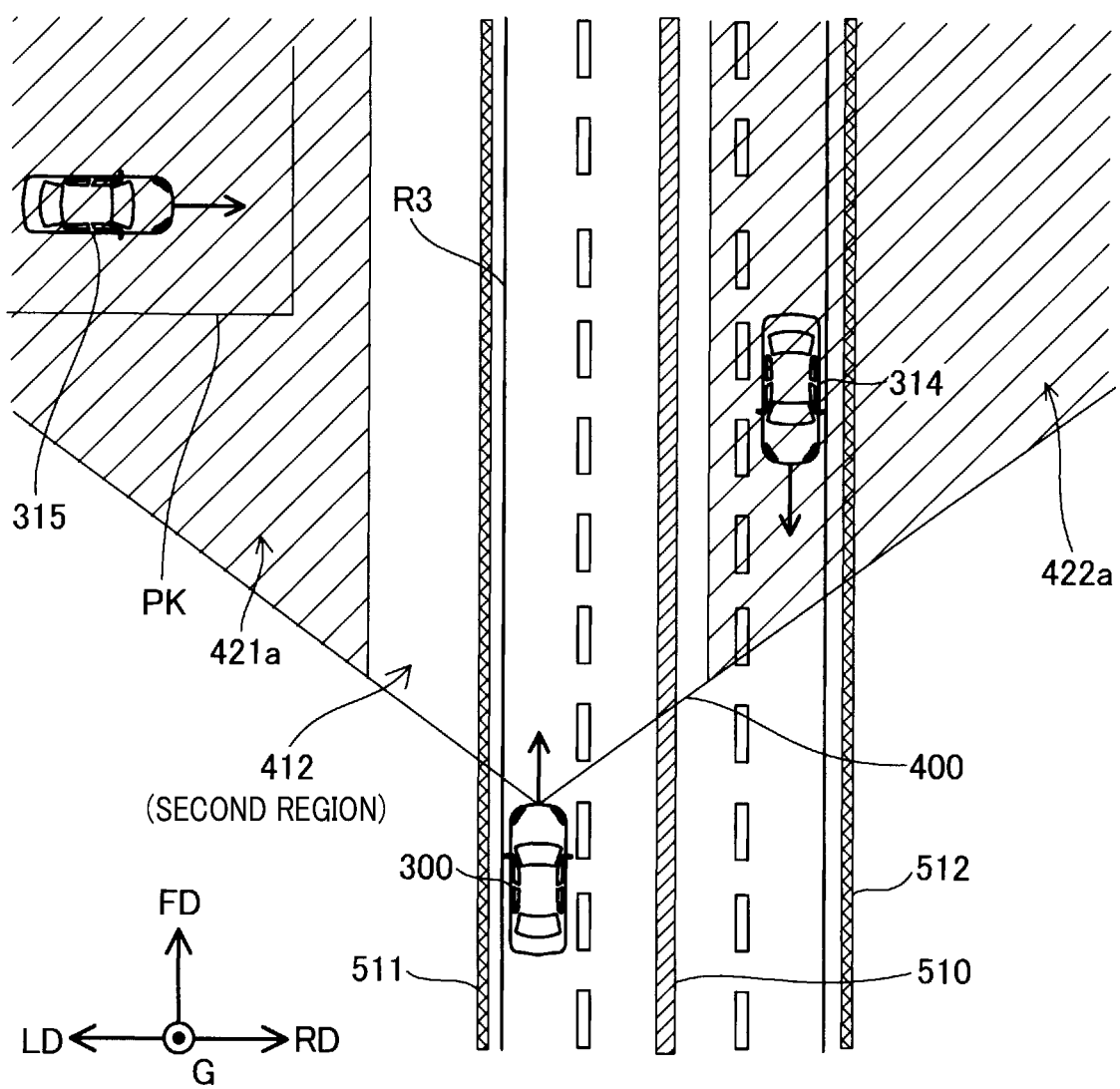
FIG. 7 is a schematic plan view illustrating another example of the situation where the second region is set as the determination region.

As shown in FIG. 7, a guardrail 511 is installed at the left end of the road R3 on which the subject vehicle 300 is traveling. Further, on the road R3, a median strip 510 is provided between the lane where the vehicle 300 is traveling and the opposite lane. On the road R3, a guardrail 512 is installed at the left end of the opposite lane of the lane on which the vehicle 300 is traveling (the left end as viewed from the traveling direction of the opposite lane vehicle). Also, a vehicle 314 is traveling on the opposite lane of the lane where the vehicle 300 is traveling.

In case that there is a wall body such as the guard rails 511 and 512 and the median strip 510 at any of the verge of the road R3 on which the subject vehicle is traveling and the space between the subject vehicle and the opposite lane vehicle as in the situation of FIG. 7, there is no intersection in the vicinity of the location where the subject vehicle 300 is traveling. Thus, it can be said that there exists no moving object proceeding in the direction crossing the traveling direction of the subject vehicle in this case. Therefore, in the present embodiment, when there is a wall body at a predetermined position, it is identified as the non-existence situation.

When it is determined that the vehicle is in the non-existence situation, the second region 412 which is relatively narrow is set as the determination region as described above. Thus, as shown in FIG. 7, no vehicle exists in the second region 412 which is the determination region as viewed from the vehicle 300. Therefore, the possibility is reduced that a vehicle 315 moving in the direction toward the road R3 (in the rightward direction RD) in a parking lot PK located in the vicinity of the road R3, for example, is erroneously detected in step S135 as the moving object having a probability of collision with the subject vehicle 300.

When it is determined in the step S225 that there is no wall body (NO in the step S225), the situation determination unit 11 performs a major road determination process (step S235).

Figure 8:
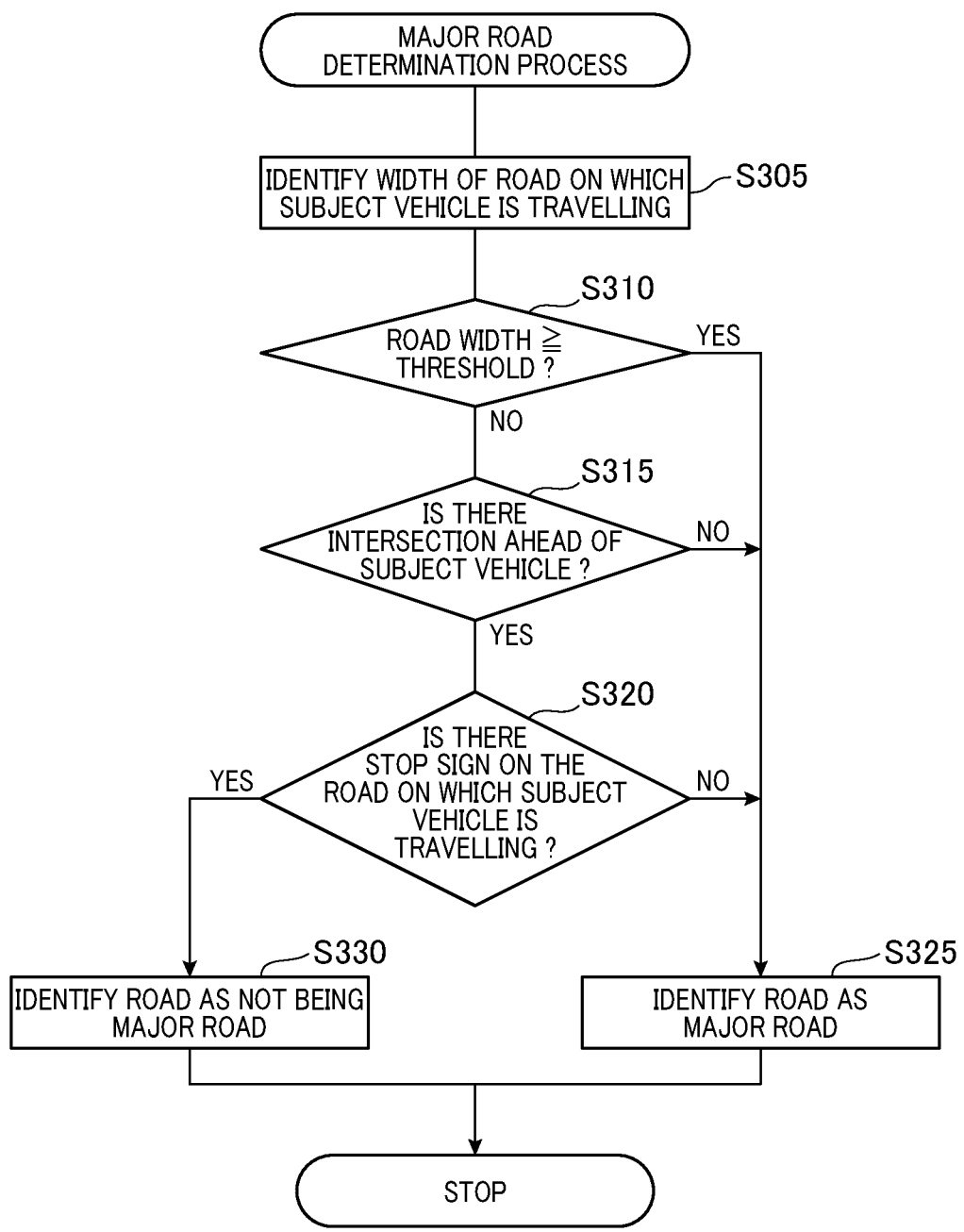
FIG. 8 is a flowchart illustrating a procedure of a major road determination process according to a first embodiment.

Referring to FIG. 8, when the major road determination process is started, the situation determination unit 11 firstly identifies the width of the road on which the subject vehicle is traveling (step S305). The road width may be identified, for example, by detecting white lines at both ends in a transverse direction of the road on which the vehicle is traveling from the images acquired by the image sensor 22 and calculating the distance between the white lines.

The situation determination unit 11 determines whether the road width identified in the step S305 is equal to or greater than a predetermined threshold (step S310). If the road width is equal to or greater than the predetermined threshold (YES in the step S310), the situation determination unit 11 identifies the road on which the subject vehicle is traveling as a major road (step S325). When the width of the road on which the subject vehicle is traveling is relatively large, the road is generally likely to be a major road.

When it is determined that the road width identified in the step S305 is not equal to or greater than a predetermined threshold (NO in the step S310), the situation determination unit 11 determines whether there is an intersection in front of the vehicle by using the detection results of the millimeter-wave radar 21 and the image sensor 22 (step S315). Here, the 'in front of the subject vehicle' refers to a forward region of a range in which the reflected waves of the millimeter waves can be received. It may be good as well to detect the object indicators based on the reflected waves of the millimeter waves, estimate the shape of the road by the image recognition applying the deep neural network based on the object indicators, and determine whether there is an intersection according to the shape of the road.

When it is determined that there is no intersection ahead of the subject vehicle (NO in the step S315), the above-described step S325 is executed and the road on which the vehicle is traveling is identified to be the major road. Contrarily, when it is determined that there is an intersection ahead of the vehicle (YES in the step S315), the situation determination unit 11 determines whether there is a stop sign on the road on which the subject vehicle is traveling (Step S320). When it is determined that there is no stop sign on the road (NO in the step S320), the S325 is executed and the road on which the vehicle is traveling is identified to be the major road. On the contrary, when it is determined that there is a stop sign on the road (YES in the step S320), the situation determination unit 11 determines that the road on which the vehicle is traveling is not a major road (Step S330). In case that the width of the road on which the subject vehicle is traveling is smaller than the threshold and there is an intersection provided with a stop sign, it is highly probable that the road intersecting with the road on which the subject vehicle is traveling is the major road. Therefore, according to the present embodiment, it is determined in such a case that the road on which the subject vehicle is traveling is not the major road.

Referring back to FIG. 6, the situation determination unit 11 determines whether the road on which the subject vehicle is traveling is a major road as a result of the major road determination process of step S235 (step S240). When it is determined that the road on which the subject vehicle is traveling is a major road (step S240: YES), the step S230 is executed and the vehicle is identified to be in the non-existence situation.

Figure 9:
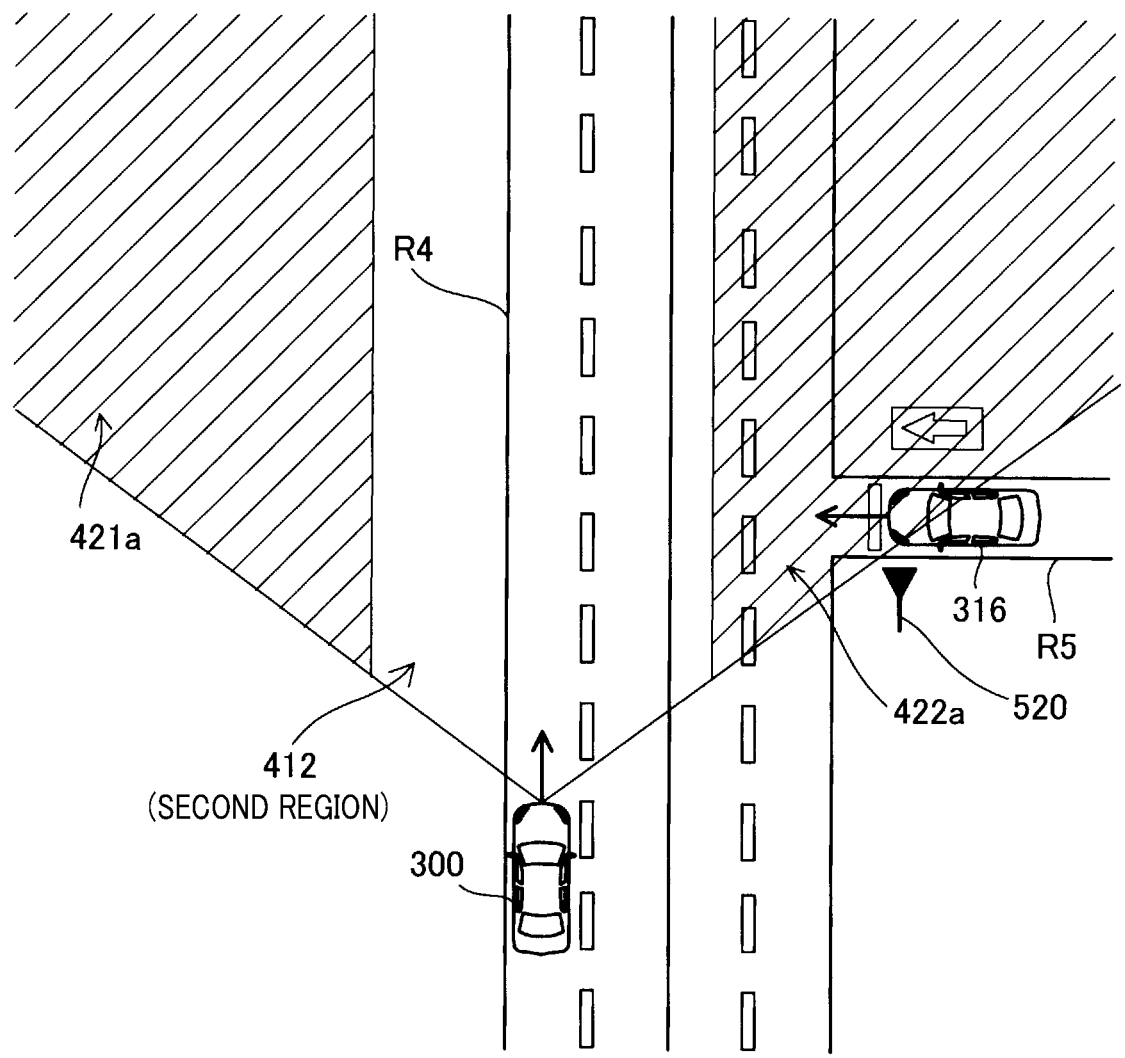
FIG. 9 a schematic plan view illustrating another example of the situation where the second region is set as the determination region.

In a situation of FIG. 9, the subject vehicle 300 is traveling on a road R4 which is a major road. This road R4 has an intersection with another road R5. The width of the road R4 is relatively large. If the road R4 is equal to or greater than the threshold, the road R4 is determined to be the major road and the subject vehicle is identified to be in the non-existence situation. Even in the case where the width of the road R4 is smaller than the threshold, the road R4 may be determined to be the major road since the road R4 has no stop sign as shown in FIG. 9. Therefore, the second region 412 which is relatively narrow is set as the determination region in this case. Meanwhile, a stop sign 520 is installed in the vicinity of the intersection on the road R5. Therefore, in case that the vehicle 316 traveling on the road R5 performs the collision avoidance supporting process, it is highly probable that the system in the vehicle 316 determines that the road R5 on which the vehicle 316 is traveling is not a major road identifies that the vehicle 316 is not in the non-existence situation.

Figure 6:
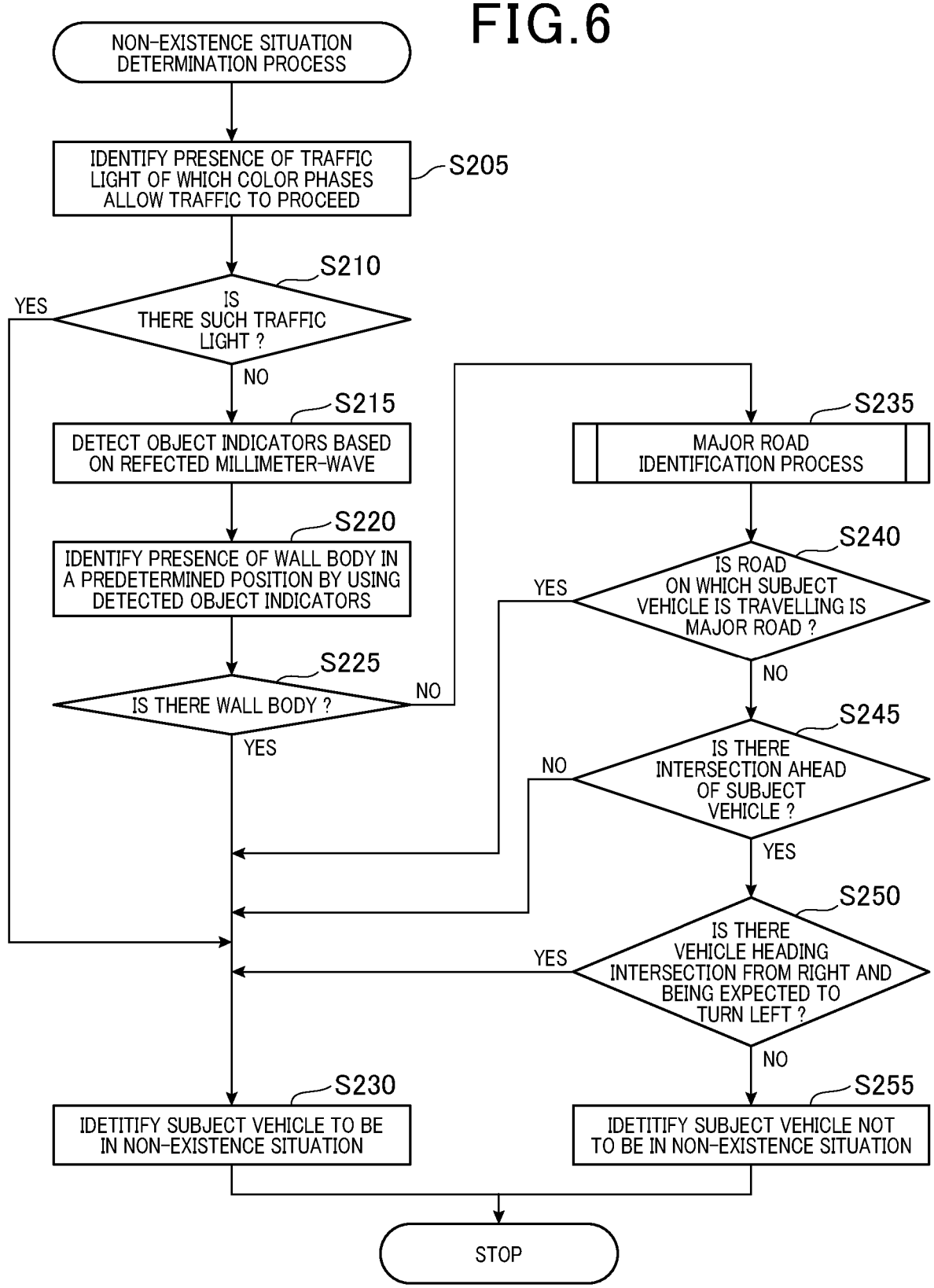
FIG. 6 is a flowchart illustrating a procedure of a non-existence situation determination process according to a first embodiment.

As shown in FIG. 6, when it is determined in the step S240 that the road on which the subject vehicle is traveling is not a major road (NO in the step S240), the situation determination unit 11 determines whether there is an intersection ahead of the vehicle by using the detection results of the millimeter-wave radar 21 and the image sensor 22 (step S245). Since this step S245 is the same as the step S315 shown in FIG. 8, the detailed description of the procedure will be omitted.

When it is determined that there is no intersection ahead of the subject vehicle (step NO in the step S245), the step S230 is executed and the vehicle is identified to be in the non-existence situation. On the other hand, when it is determined that there is an intersection ahead of the subject vehicle (YES in the step S245), the situation determination unit 11 determines the presence of a vehicle which is heading toward the intersection from the right direction as viewed from the subject vehicle 300 and being predicted to turn left (Step S250). In the present embodiment, the situation determination unit 11 analyzes the images acquired by the image sensor 22 to identify a vehicle heading toward the intersection from the right direction and simultaneously identify whether direction indicators of the vehicle indicate a left turn. The situation determination unit 11 determines the presence of a vehicle heading toward the intersection from the right direction as viewed from the subject vehicle 300 and being predicted to turn left by using the identification result. When it is determined that there is a vehicle heading toward the intersection from the right direction as viewed from the subject vehicle 300 and being predicted to be scheduled to turn left (YES in the step S250), the step S230 is executed and the subject vehicle 300 is determined to be in the non-existence situation.

Figure 10:
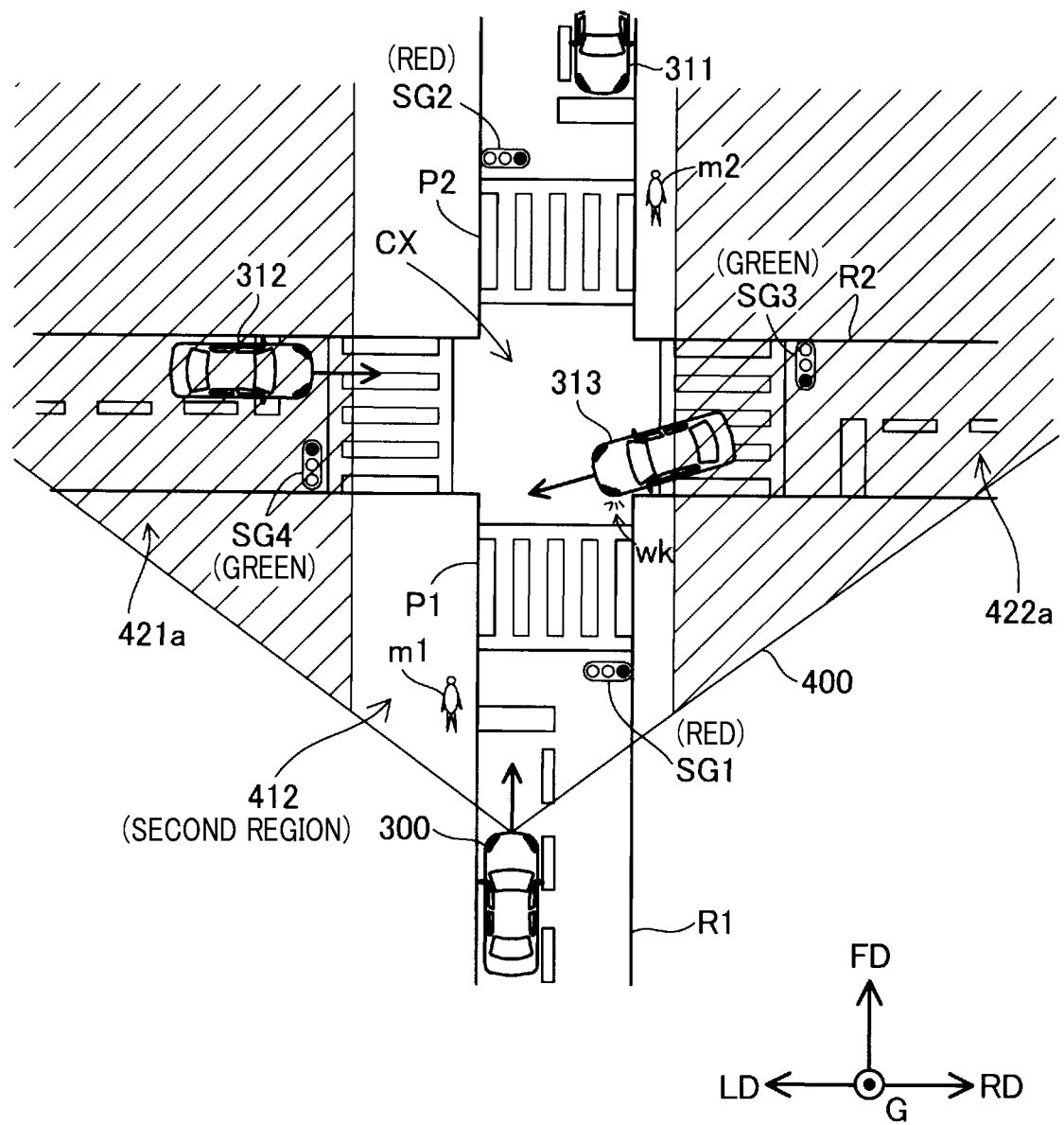
FIG. 10 a schematic plan view illustrating another example of the situation where the second region is set as the determination region.

The situation depicted in FIG. 10 is similar to the situation of FIG. 4 except that the vehicle 313 is going to turn left instead of proceeding in the forward direction. Since the vehicle 313 traveling on the road R2 that crosses the road R1 and heading toward the intersection CX from the right direction as viewed from the subject vehicle 300 is going to turn left as shown in FIG. 10, the direction indicator wk will be flashing to indicate the left turn. Therefore, the subject vehicle is identified to be in the non-existence situation in this situation, and the determination region is set to be the second region 412 which is narrower than the corresponding region in FIG. 4. In the case where the vehicle 313 heading toward the intersection from the right direction is predicted to be scheduled to turn left, the probability that the corresponding vehicle 313 collides with the subject vehicle 300 is low. Thus, subject vehicle 300 is identified to be in the non-existence situation and the relatively narrow second region 412 is set as the determination region in this case.

Referring back to FIG. 6, when it is determined in the step S250 that there is no vehicle heading toward the intersection from the right direction as viewed from the subject vehicle 300 and being predicted to be scheduled to turn left (NO in the step S250), the situation determination unit 11 identifies that the subject vehicle 300 is not in the non-existence situation (step S255).

According to the vehicle collision avoidance supporting apparatus 100 of the first embodiment described above, when it is determined that there exists no moving object proceeding in the direction crossing the traveling direction FD of the subject vehicle 300, the determination region is set to be relatively narrow in the horizontal direction perpendicular to the travelling direction compared with the case where it is determined that the moving object may exist, so as to suppress the erroneous detection of the moving object proceeding in the crossing direction and having a high probability of collision with the subject vehicle. When it is not a situation that there exists no moving object proceeding in the crossing direction, that is, when there may exist a moving object, the determination region is set to be relatively wide, so that it is easy to detect the moving object proceeding in the crossing direction and having a high probability of collision with the subject vehicle. Therefore, according to the vehicle collision avoidance supporting apparatus 100 of the first embodiment, it is possible to accurately detect the moving object moving in the direction crossing the traveling direction of the subject vehicle.

Also, since the vehicle is identified to be in the non-existence situation when a traffic light allowing traffic to proceed in the forward direction is identified in the images of foreground of the subject vehicle acquired by the image sensor 22, the situation that there exists no moving object proceeding in the direction crossing the traveling direction of the subject vehicle may be identified accurately. When there is a traffic light allowing traffic to proceed in the forward direction, there may be a road intersecting with the road on which the subject vehicle is travelling and there may be another vehicle on such a crossing road. However, a traffic light on the crossing road would show the color phase which prohibits any traffic from proceeding, and the corresponding vehicle on the crossing road is likely to be stopped at the intersection. Therefore, in this case, there is a high probability that there exists no moving object proceeding in the direction crossing the travelling direction of the subject vehicle.

Also, since the vehicle is identified to be in the non-existence situation when a wall body is detected, based on the detection result of the millimeter-wave radar 21, in any of the verges of the road on which the subject vehicle is traveling and the space between the subject vehicle and the opposite lane vehicle, the situation that there exists no moving object proceeding in the direction crossing the traveling direction of the subject vehicle may be identified accurately. When the wall body is detected in any of the verges of the road on which the subject vehicle is traveling and the space between the subject vehicle and the opposite lane vehicle, the probability of existence of a road intersecting with the road on which the subject vehicle is traveling is low. Therefore, there is a high possibility that there exists no moving object proceeding in the direction crossing the travelling direction of the subject vehicle.

Also, since the vehicle is identified to be in the non-existence situation when the road on which the subject vehicle is traveling is identified to be the major road based on the detection results of the millimeter-wave radar 21 and the image sensor 22, the situation that there exists no moving object proceeding in the direction crossing the traveling direction of the subject vehicle may be identified accurately. When the road on which the subject vehicle is traveling is identified to be the major road, the vehicle on the road intersecting with the road on which the subject vehicle is traveling is likely to be stopped until the subject vehicle passes in front of the corresponding vehicle. Therefore, there is a high possibility that there exists no moving object proceeding in the direction crossing the travelling direction of the subject vehicle.

Also, since the road on which the subject vehicle is traveling is identified as a major road when the width of the road on which the subject vehicle is traveling is equal to or greater than a predetermined threshold or when an intersection is detected ahead of the subject vehicle and there is no stop sign in the vicinity of the intersection on the road on which the subject vehicle is traveling, it is possible to accurately determine whether the road on which the subject vehicle is traveling is a major road. When an intersection is detected ahead of the subject vehicle and there is no stop sign in the vicinity of the intersection, the road on which the subject vehicle is traveling is more likely to be a major road than the road intersecting with the corresponding road.

Also, it is determined that there exists no moving object when an intersection is detected ahead of the subject vehicle and there is another vehicle heading toward the intersection from the right as viewed from the subject vehicle and being predicted to be scheduled to turn left, it is possible to accurately determine that there exists no moving object. In the case that an intersection is detected and there is a vehicle heading toward the intersection from the right as viewed from a proceeding direction and being predicted to be scheduled to turn left, the probability that the subject vehicle collides with such a vehicle turning left is low.

Further, since a vehicle heading toward an intersection from the right as viewed from the subject vehicle and predicted to be scheduled to turn left is detected when the direction indicators of the vehicle indicate the left turn, it is possible to precisely detect such a vehicle predicted to be scheduled to turn left.

B. Second Embodiment

Since the configuration of the vehicle collision avoidance supporting apparatus according to a second embodiment is the same as that of the vehicle collision avoidance supporting apparatus 100 according to the first embodiment, the same reference numerals are given to the same constituent elements and detailed descriptions thereof will be omitted. The collision avoidance supporting process of the second embodiment is the same as the collision avoidance supporting process of the first embodiment except for the procedure of the major road determination process.

As shown in FIG. 11, the major road determination process according to the second embodiment is different from the first embodiment shown in FIG. 8 in the steps S305, S310, and S320 are omitted and a step S317 is executed additionally. Since the other steps of the major road determination process of the second embodiment are the same as the major road determination process of the first embodiment, the same steps are denoted by the same reference numerals and detailed description thereof will be omitted.

In the major road determination process according to the second embodiment, the situation determination unit 11 firstly executes the step S315 to determine whether there is an intersection ahead of the subject vehicle. If it is determined that is no intersection ahead of the subject vehicle (NO in the step S315), the step 325 is executed and the road on which the subject vehicle is traveling is identified as a major road.

On the other hand, when it is determined that there is an intersection ahead of the vehicle (YES in the step S315), the situation determination unit 11 determines whether the accelerator opening level detected by the accelerator opening level sensor 24 is equal to or greater than a predetermined threshold (Step S317). If it is determined that the accelerator opening level is equal to or greater than the predetermined threshold (YES in the step S317), the step S325 is executed and the road on which the subject vehicle is traveling is identified as the major road. Conversely, if it is determined that the accelerator opening level is not larger than the predetermined threshold (NO in the step S317), the step S330 is executed and the road on which the subject vehicle is traveling is identified as not being the major road.

In case that there is an intersection ahead and the accelerator opening level is equal to or greater than the threshold, it is presumed that the driver intends to pass through the intersection (more specifically, the road crossing at the intersection) at high speed. Such an intention usually occurs when the road on which the subject vehicle 300 is traveling is a major road. Thus, according to the second embodiment, when there is an intersection ahead and the accelerator opening level is equal to or greater than the threshold, the road on which the subject vehicle is traveling is identified as the major road. On the other hand, in case that there is an intersection ahead of the subject vehicle and the accelerator opening level is smaller than the threshold, it is presumed that the driver intends to stop at the intersection or slowly pass through the intersection (more specifically, the road crossing at the intersection). Such an intention usually occurs when the road on which the subject vehicle 300 is traveling is not a major road (e.g. road crossing at the intersection is a major road). Therefore, in the second embodiment, when there is an intersection ahead and the accelerator opening level is smaller than the threshold, the road on which the subject vehicle is traveling is identified as not being the major road.

The vehicle collision avoidance supporting apparatus according to the second embodiment described above has the same advantages as the vehicle collision avoidance supporting apparatus 100 of the first embodiment. Additionally, since the road on which the subject vehicle is traveling is determined to be a major road when an intersection ahead of the subject vehicle is detected and the accelerator opening level is equal to or greater than the threshold, it is possible to accurately determine whether the road on which the subject vehicle is traveling is a major road.

C. Modifications

C1. Modified Example 1

Even though the collision avoiding operation is alerting and braking in each embodiment described above, but the present disclosure is not limited thereto. Only one of alerting and braking may be applied as well. Also, another operation along with one of or both of the alerting and braking operations may be performed for the collision avoiding operation. For example, the collision avoiding operation may include one or more of the following operations:

(a) automatically closing a throttle valve of the subject vehicle;

(b) increasing assist oil pressure of the brake to improve response characteristics of the brake to an operation of a brake pedal;

(c) steering automatically so as to change the proceeding direction of the subject vehicle to a direction avoiding a collision with the moving object; and (d) automatically taking up a seat belt to suppress the movement of an occupant at the instant of a collision.

C2. Modified Example 2

Even though both the braking start timing and the deceleration are relaxed in the relaxed operation mode compared with the normal operation mode in the embodiment described above, only one of them may be relaxed as well. In such a case, one factor which is not relaxed may be reinforced compared with the other factor. Also, in the relaxed operation mode, the alerts may be relaxed in addition to the braking start timing and the deceleration. For example, the alert timing may be retarded from the timing Tx. Alternatively, the volume of the alert sound may be reduced. Also, brightness of the lamp used for the alert may be lowered.

C3. Modified Example 3

In the embodiment described above, the braking start timing and the deceleration are different between the normal operation mode and the relaxed operation mode. Also, in the modified example 2, the alert timing, the size of the alert sound, and the like are different between the two modes. In addition to such collision avoiding operations, other operations may be differentiated additionally between the normal operation mode and the relaxed operation mode. For example, the types of sensors used for detecting a moving object having a probability of collision in the determination region may be different between the normal operation mode and the relaxed operation mode. Such a configuration will now be described with reference to FIG. 12.

The upper part of FIG. 12 shows which sensor's detection result may affect the initiation of each avoidance operation in the normal operation mode. Also, the lower part of FIG. 12 shows which sensor's detection result may affect the initiation of each avoidance operation in the relaxed operation mode. In upper and lower parts of FIG. 2, 'O (ALLOWED)' means that the corresponding avoidance operation is allowable or executable when the corresponding sensor detects a moving object having a probability of collision with the subject vehicle in the determination region. 'X (NOT ALLOWED)' means that the corresponding avoidance operation is not allowable or executable when the corresponding sensor detects a moving object having a probability of collision with the subject vehicle in the determination region.

As shown in the upper part of FIG. 12, relationships between the avoidance operations and the sensors in the normal operation mode are the same as the descriptions provided above. For example, when both the detection result of the millimeter wave radar 21 and the detection result of the image sensor 22 indicate the detection of a moving object having the probability of colliding with the subject vehicle or when only the detection result of the millimeter wave radar 21 indicates the detection of the moving object having the probability of the collision, both the alerting and braking operations are allowed to be executed. Meanwhile, only the detection result of the image sensor 22 indicates the detection of the moving object having the probability of the collision, both the alerting and braking operations are not allowed to be executed. It is because the detection result of the image sensor 22 is inferior to the detection result of the millimeter-wave radar 21.

On the other hand, as shown in the lower part of FIG. 12, the relationships between the avoidance operations and the sensors in the relaxed operation mode are different from those in the normal operation mode in the case that only the detection result of the millimeter wave radar 21 indicates the detection of the moving object having the probability of the collision with the subject vehicle. Specifically, when only the detection result of the millimeter wave radar 21 indicates the detection of the moving object having the probability of the collision with the subject vehicle, the alerting operation is allowed to be executed but the braking operation is not allowed to be executed. In the relaxed operation mode, the determination region is set to the second region 412 which is relatively narrow because the vehicle is identified to be in the non-existence situation in this mode. In the non-existence situation, even if only one sensor detects the existence of the moving object possibly colliding with the subject vehicle, the detection may be erroneous. The braking operation in such a case is likely to be found to be unnecessary and may result in a rear-end collision with a following vehicle. Therefore, in this modified example, the braking operation is not allowed to be performed in such a case.

Meanwhile, there may an upper limit for the vehicle speed allowing the collision avoiding operation. The upper limit for the vehicle speed allowing the collision avoiding operation is desirable because a sudden braking at a very high speed is dangerous and should be avoided preferably. The upper limit for the vehicle speed may be set differently between the normal operation mode and the relaxed operation mode. For example, the upper limit for the vehicle speed may be set at 80 kilometers per hour (km/h) in the normal operation mode while being set at 60 kilometers per hour in the relaxed operation mode. In the normal operation mode, the subject vehicle is identified not to be in the non-existence situation and there is a high probability that a moving object possibly colliding with the subject vehicle exists. Thus, in this operation mode, the braking operation may be required to avoid the collision and reduce the danger even when the vehicle is traveling at a high speed. Contrarily, in the relaxed operation mode, the subject vehicle is identified to be in the non-existence situation and it is less probable that a moving object possibly colliding with the subject vehicle exists. Thus, in this operation mode, it is desirable to suppress a sudden braking operation which may be caused by erroneous detection of the moving object having a high probability of collision and reduce the risk caused by the sudden braking.

C4. Modified Example 4

The major road determination process is not limited to the procedure of each of the embodiments above. For example, when the subject vehicle is traveling a certain road, the road on which the subject vehicle is traveling may be identified as the major road if a stop sign is not detected on the road on which the subject travels a predetermined distance, for example, one kilometer.

C5. Modified Example 5

Though the following determination processes (i)-(iv) are executed sequentially during the non-existence situation determination procedure in each of the embodiments described above, one or more processes may be omitted. Also, two or more of the determination processes (i)-(iv) may be executed in parallel.

(i) determining whether a traffic light having a color phase allowing traffic to proceed forward is present or not.

(ii) determining whether a wall body is present at a predetermined position or not.

(iii) determining whether the road on which the subject vehicle is traveling is a major road or not.

(iv) determining whether a vehicle heading toward the intersection from the right as viewed from the subject vehicle and being predicted to turn left exists or not.

If at least some of the determination processes executed in parallel reveal that the subject vehicle is not in the non-existence situation, the subject vehicle may be identified not to be in the non-existence situation as a final conclusion. By doing this, it is possible to further reduce the probability of collision with a moving object having a probability of the collision. Conversely, at least some of the determination processes executed in parallel reveal that the subject vehicle is in the non-existence situation, the subject vehicle may be identified to be in the non-existence situation as a final conclusion. Also, instead of the determination processes (i)-(iv), the presence of a moving object proceeding in a direction crossing the traveling direction of the subject vehicle may be checked based on the detection results of the millimeter wave radar 21 or the image sensor 22. If it is determined that such a moving object does not exist, the subject vehicle may be identified to be in the non-existence situation. If, however, it is determined that such a moving object exists, the subject vehicle may be identified not to be in the non-existence situation.

C 6. Modified Example 6

Though two kinds of regions, the first region 411 and the second region 412, may be set as the determination region in the embodiments described above, three or more kinds of regions may be set as the determination region as well. For example, a region having a width that is narrower than the first region 411 but larger than the second region 412 (referred to as 'third region' hereinbelow) may be added to a set of regions including the first and second regions 411 and 412. Specifically, for example, as in Modification 5 above, all of the determination processes (i)-(iv) described above with regard to the Modified Example 7 may be executed in parallel, and the first region 411 may be set as the determination region when all the determination processes reveal that the subject vehicle is not in the 'non-existence situation' while the second region 412 may be set as the determination region when all the determination processes reveal that the subject vehicle is in the 'non-existence situation', and the third region may be set as the determination region when some of the determination processes reveal that the subject vehicle is not in the 'non-existence situation.'

C7. Modified Example 7

Though the determination of the presence of an intersection ahead (steps S245 and S315) is executed using the detection results of the millimeter-wave radar 21 and the image sensor 22 in each of the embodiments described above, the present disclosure is not limited thereto. For example, it is possible to query to a navigation device whether the current position of the subject vehicle is in the vicinity of an intersection or within the intersection, and determine whether there is an intersection ahead of the subject vehicle by using a response of the navigation device. Similarly, whether or not the road on which the subject vehicle is traveling is a major road may also be determined using map information or the like of the navigation device. Meanwhile, though the presence or absence of a vehicle that is heading from the right to the intersection and being predicted to be scheduled to turn left is determined based on the presence of a direction indicator indicating the left turn in the captured image of the image sensor 22 in the embodiments described above, the present disclosure is not limited thereto. For example, it is possible to identify all the vehicles on the road on the road intersecting the road on which the subject vehicle is traveling by using the detection results of the millimeter-wave radar 21 and the image sensor 22, and determine that there is a vehicle that is heading from the right to the intersection and being predicted to be scheduled to turn left if there exists a vehicle on a left-turn-only lane. Whether a lane is left-turn-only or not may be determined by using, for example, the map information or the like of the navigation device.

C8. Modified Example 8

In each embodiment, an arbitrary type of sensor, such as a laser radar, that may detect the presence of an object or the position of the object by using reflected waves of an arbitrary type of electromagnetic waves may be used instead of the millimeter-wave radar 21 or in addition to the millimeter-wave radar 21. Such a sensor corresponds to a specific implementation of the first sensor described in the column of the technical solution.

C9. Modified Example 9

In each embodiment, some of the configuration implemented by hardware may be replaced by software, and, conversely, some of the configuration implemented by the software may be replaced by the hardware. For example, the detection of the object identifies carried out by the millimeter-wave radar 21 may be implemented by a functional unit that may be operating by the execution of software by the ECU 10. Also, the avoidance operation controller 12, for example, may be implemented by an integrated circuit, a discrete circuit, or a module in which such circuits are combined. In addition, in case that some or all of the functions of the present disclosure are implemented by software, the software or computer program may be provided in a form stored in a computer-readable recording medium. The 'computer-readable recording medium' is not limited to a portable storage medium such as a floppy disk and a CD-ROM, but may include an internal storage device of a computer such as a RAM and a ROM, or an external storage device such as a hard disk attached to the computer. That is, the 'computer-readable recording medium' used in broad sense to include arbitrary non-transitory recording medium that can store data.

The present disclosure is not limited to the above-described embodiments and modifications, and can be implemented in various configurations without departing from the spirit thereof. For example, technical features of each of the embodiments and modified embodiments corresponding to the technical features described in the Summary of the Invention column may be replaced or combined appropriately to solve some or all of the conventional problems or to achieve some or all of the advantages of the invention. Also, unless a technical feature is described as being essential in this specification, such a technical feature may be omitted appropriately.

DESCRIPTION OF SYMBOLS

100 Vehicle Collision Avoidance supporting apparatus
10 ECU
11 Situation Determination Unit
12 Avoidance Operation Controller
21 Millimeter Wave Radar
22 Image Sensor

What is claimed is:

1. A vehicle collision avoidance supporting apparatus, comprising:
    a situation determination unit configured to determine whether there is a situation of no moving object existing and proceeding in a direction crossing a traveling direction of a vehicle;
    a first sensor configured to detect an object ahead of the vehicle; and
    an avoidance operation controller configured to
        set a determination region in front of the vehicle in a perpendicular and horizontal direction to the traveling direction of the vehicle, and
        cause the vehicle to perform a predetermined avoidance operation for avoiding a collision in accordance with a detection result of the first sensor in the determination region ahead of the vehicle,
    wherein, in response to determining the situation of no moving object existing, the avoidance operation controller sets a second region as the determination region, and in response to determining a situation of a moving object existing, the avoidance operation controller sets a first region as the determination region,
    wherein the second region is narrower than the first region in a direction perpendicular to the traveling direction and parallel to a horizontal direction,
    wherein the first sensor comprises an image sensor, and
    wherein the situation determination unit identifies whether a first traffic light of a color phase allowing forward movement is present in front of the vehicle on a road on which the vehicle is traveling, in an image for an area ahead of the vehicle acquired by the image sensor, and determines that there is the situation of no moving object existing in response to the first traffic light of the color phase allowing the forward movement being identified to be present.

2. The vehicle collision avoidance supporting apparatus according to claim 1, wherein from the detection result of the first sensor, the situation determination unit determines whether at least one wall body is detected from a verge of a road on which the vehicle is traveling or from a space between the vehicle and an opposite lane vehicle, and determines that there is the situation of no moving object existing, when in response to at least one wall body is being determined from the verge of the road on which the vehicle is traveling or from the space between the vehicle and the opposite lane vehicle.

3. The vehicle collision avoidance supporting apparatus according to claim 2, wherein the situation determination unit determines whether a road on which the vehicle is traveling is a major road, based on the detection result of the first sensor, and determines that there is the situation of no moving object existing, in response to the road on which the vehicle is traveling being determined as the major road.

4. The vehicle collision avoidance supporting apparatus according to claim 3, wherein the situation determination unit determines that the road on which the vehicle is traveling is the major road, in response to a width of the road on which the vehicle is traveling that is estimated by use of the detection result of the first sensor being equal to or greater than a predetermined threshold or in response to an intersection being detected ahead of the vehicle by use of the detection result of the first sensor and there is no stop sign existing near the intersection on the road on which the vehicle is traveling.

5. The vehicle collision avoidance supporting apparatus according to claim 3, further comprising:
an accelerator opening level sensor configured to detect an accelerator opening level of the vehicle,
wherein the situation determination unit determines that the road on which the vehicle is traveling is the major road, in response to the intersection being detected ahead of the vehicle by use of the detection result of the first sensor, and the accelerator opening level detected by the accelerator opening level sensor is equal to or greater than a predetermined size.

6. The vehicle collision avoidance supporting apparatus according to claim 1, wherein the situation determination unit determines that that there is the situation of no moving object existing, in response to an intersection being detected ahead of the vehicle by use of the detection result of the first sensor and another vehicle heading towards the intersection from a right, based on being viewed in the traveling direction, and being predicted to turn left is detected.

7. The vehicle collision avoidance supporting apparatus according to claim 6, wherein the situation determination unit detects the another vehicle being predicted to turn left in response to a direction indicator of a vehicle heading toward the intersection from the right indicating a left turn in the detection result of the first sensor.

8. The vehicle collision avoidance supporting apparatus according to claim 7, wherein the situation determination unit determines whether there exists any moving object in the detection result of the first sensor, and determines that that there is the situation of no moving object existing when in response to there being a situation of not any moving object existing in the detection result of the first sensor.

9. The vehicle collision avoidance supporting apparatus according to claim 1, wherein the situation determination unit determines whether a road on which the vehicle is traveling is a major road, based on the detection result of the first sensor, and determines that there is the situation of no moving object existing, in response to the road on which the vehicle is traveling being determined as the major road.

10. The vehicle collision avoidance supporting apparatus according to claim 9, wherein from the detection result of the first sensor, the situation determination unit determines whether at least one wall body is detected from a verge of a road on which the vehicle is traveling or from a space between the vehicle and an opposite lane vehicle, and determines that there is the situation of no moving object existing, in response to at least one wall body being determined from the verge of the road on which the vehicle is traveling or from the space between the vehicle and the opposite lane vehicle.

11. The vehicle collision avoidance supporting apparatus according to claim 9, wherein the situation determination unit determines that the road on which the vehicle is traveling is the major road, in response to a width of the road on which the vehicle is traveling that is estimated by use of the detection result of the first sensor being equal to or greater than a predetermined threshold, or in response to an intersection being detected ahead of the vehicle by use of the detection result of the first sensor and there is no stop sign existing near the intersection on the road on which the vehicle is traveling.

12. The vehicle collision avoidance supporting apparatus according to claim 11, further comprising:
an accelerator opening level sensor configured to detect an accelerator opening level of the vehicle,
wherein the situation determination unit determines that the road on which the vehicle is traveling is the major road in response to the intersection being detected ahead of the vehicle by use of the detection result of the first sensor and the accelerator opening level detected by the accelerator opening level sensor being equal to or greater than a predetermined size.

13. The vehicle collision avoidance supporting apparatus according to claim 10, further comprising:
an accelerator opening level sensor configured to detect an accelerator opening level of the vehicle,
wherein the situation determination unit determines that the road on which the vehicle is traveling is the major road in response to the intersection being detected ahead of the vehicle by use of the detection result of the first sensor and the accelerator opening level detected by the accelerator opening level sensor being equal to or greater than a predetermined size.

14. The vehicle collision avoidance supporting apparatus according to claim 10, wherein the situation determination unit determines that there is the situation of no moving object existing, in response to an intersection being detected ahead of the vehicle by use of the detection result of the first sensor and another vehicle heading towards the intersection from a right, based on being viewed in the traveling direction, and being predicted to turn left is detected.

15. The vehicle collision avoidance supporting apparatus according to claim 14, wherein the situation determination unit detects the another vehicle being predicted to turn left, in response to a direction indicator of a vehicle heading toward the intersection from the right indicating a left turn in the detection result of the first sensor.

16. The vehicle collision avoidance supporting apparatus according to claim 1, wherein from the detection results of the first sensor, the situation determination unit determines whether there exists any moving object in the detection result of the first sensor, and determines that that there is the situation of no moving object existing in response to there being a situation of not any moving object existing in the detection result of the first sensor.

17. The vehicle collision avoidance supporting apparatus according to claim 1, wherein
the situation determination unit identifies whether a second traffic light of a color phase prohibiting forward movement in the direction crossing a traveling direction of the vehicle is present, and determines that there is the situation of no moving object existing when the second traffic light of the color phase prohibiting the forward movement is identified to be present.

18. The vehicle collision avoidance supporting apparatus according to claim 17, wherein the second traffic light prohibiting forward movement in the direction crossing the traveling direction of the vehicle is disposed at an intersection.

19. The vehicle collision avoidance supporting apparatus according to claim 1, wherein for a state in which the situation that no moving object existing in a vicinity of an intersection or within an intersection and is travelling along a curve, the avoidance operation controller is configured to set a third region as the determination region, the third region being narrower than the first region and second region.

20. A vehicle collision avoidance supporting method, comprising operations of:
(a) determining whether there is a situation of no moving object proceeding in a direction crossing a traveling direction of a vehicle;
(b) detecting an object ahead of the vehicle; and
(c) causing the vehicle to set a determination region in front of the vehicle in a perpendicular and horizontal direction to the traveling direction of the vehicle, and causing the vehicle to perform a predetermined avoidance operation in the vehicle for avoiding a collision in accordance with a detection result of operation (b) within a determination region in front of the vehicle, wherein, in response to determining the situation of no moving object existing at operation (a), operation (c) includes an operation of setting a second region as the determination region,
wherein, in response to determining a situation of a moving object existing at operation (a), operation (c) includes an operation of setting a first region as the determination region, and
wherein the second region is narrower than the first region in a direction perpendicular to the traveling direction and parallel to a horizontal direction,
the method further comprising:
identifying whether a traffic light of a color phase allowing forward movement is present in front of the vehicle on a road on which the vehicle is traveling, using an image for an area ahead of the vehicle; and
determining that there is the situation of no moving object existing in response to the traffic light of the color phase allowing the forward movement being identified to be present.

* * * * *